United States Patent
Takahashi et al.

(10) Patent No.: US 12,093,653 B2
(45) Date of Patent: Sep. 17, 2024

(54) ANALYZER, MORAL ANALYSIS METHOD, AND RECORDING MEDIUM

(71) Applicant: Hitachi, Ltd., Tokyo (JP)

(72) Inventors: Koji Takahashi, Tokyo (JP); Yasuto Nishiwaki, Tokyo (JP); Masataka Oshima, Tokyo (JP); Hiromasa Nakashima, Tokyo (JP)

(73) Assignee: HITACHI, LTD., Tokyo (JP)

( * ) Notice: Subject to any disclaimer, the term of this patent is extended or adjusted under 35 U.S.C. 154(b) by 275 days.

(21) Appl. No.: 17/680,533

(22) Filed: Feb. 25, 2022

(65) Prior Publication Data
US 2023/0058235 A1    Feb. 23, 2023

(30) Foreign Application Priority Data
Aug. 17, 2021 (JP) .................. 2021-132826

(51) Int. Cl.
*G06F 40/30*    (2020.01)
*G06F 40/242*   (2020.01)
*G06F 40/279*   (2020.01)

(52) U.S. Cl.
CPC ......... *G06F 40/30* (2020.01); *G06F 40/242* (2020.01); *G06F 40/279* (2020.01)

(58) Field of Classification Search
CPC ...... G06F 40/30; G06F 40/242; G06F 40/279; G06F 40/253
See application file for complete search history.

(56) References Cited

U.S. PATENT DOCUMENTS

| | | | |
|---|---|---|---|
| 2007/0087798 A1* | 4/2007 | McGucken | A63F 13/45 463/1 |
| 2008/0005051 A1* | 1/2008 | Turner | G06F 40/242 706/20 |
| 2011/0239112 A1* | 9/2011 | Nakano | G06F 3/0237 715/261 |
| 2020/0089767 A1* | 3/2020 | Ni | G06Q 30/016 |
| 2021/0374170 A1 | 12/2021 | Kato et al. | |

FOREIGN PATENT DOCUMENTS

JP    2020-119254 A    8/2020

* cited by examiner

*Primary Examiner* — Huyen X Vo
(74) *Attorney, Agent, or Firm* — MATTINGLY & MALUR, PC

(57) ABSTRACT

A moral analysis unit extracts, as a moral expression word, a word matching a morality-related word related to morality from acquired data which is text data on the basis of a moral foundations dictionary which is dictionary data defining the morality-related word. A processed data display unit analyzes the moral value of the acquired data by using the moral expression word.

9 Claims, 19 Drawing Sheets

203 Text

208 Processed data

ANALYZER, MORAL ANALYSIS METHOD, AND RECORDING MEDIUM

CROSS-REFERENCE TO PRIOR APPLICATION

This application relates to and claim the benefit of priority from Japanese Patent Application No. 2021-132826 filed on Aug. 17, 2021 the entire disclosure of which is incorporated herein by reference.

BACKGROUND

The present disclosure relates to a moral analyzer, a moral analysis method, and a recording medium.

Communication using social media such as blogs and social networking services has become widespread, and consequently a large amount of text data has been accumulated. Moreover, organizations such as companies also increasingly accumulate text data using intranet and the like. In recent years, analyzing such a large amount of accumulated text data and utilizing the large amount of accumulated text data for the purpose of corporate activities has been considered, raising a demand for a technique for efficiently extracting desired text data from the large amount of text data and quantitatively analyzing or visualizing the extracted text data.

Japanese Patent Application Publication No. 2020-119254 discloses a technique for acquiring, on the basis of a keyword for acquiring text data, related words relating to the keyword, and acquiring text data corresponding to the keyword and the related words.

SUMMARY

In recent years, organizations such as companies have been required to not only provide value, but also to perform business by taking into account social responsibility and corporate ethics such as ESG and SDGs (Sustainable Development Goals), as well as moral aspects such as human rights. In addition, since the demands on companies from consumers and investors are increasing, there are many cases where, when unintended human rights violations occur in the development and advertising of products and services, companies are criticized harshly in the society. In such a case, speedy and appropriate measures need to be taken. However, it is difficult to quantify and objectively evaluate moral expressions related to the social responsibility, corporate ethics, human rights, and the like, and the abovementioned case has been dealt with personally. For this reason, appropriate measures may not be able to be taken due to the individuality of the person in charge, the organizational culture, or the like. In addition, as values are highly diversified, quantitative and objective analysis of a large amount of text data containing opinions of people can provide companies with some insight into how to deal with problems that should be dealt with, or can make the companies aware of specific improvement plans in the development of services and products. Therefore, there is also a problem in that while the analysis of text data is important in corporate activities, the analysis cannot be done properly without a person with specialized knowledge and experience.

Although the technique described in Japanese Patent Application Publication No. 2020-119254 can collect text data, but Japanese Patent Application Publication No. 2020-119254 does not describe anything about evaluating moral expressions contained in the collected text data.

An object of the present disclosure is to provide a moral analyzer capable of evaluating moral expressions contained in text data, a moral analysis method, and a recording medium.

A moral analyzer according to one aspect of the present disclosure includes an extraction unit configured to extract, as a moral expression word, a word matching a morality-related word related to morality from text data on the basis of dictionary data defining the morality-related word, and an analysis unit configured to analyze a moral value of the text data by using the moral expression word.

According to the present invention, moral expressions contained in text data can be evaluated.

DETAILED DESCRIPTION OF THE EMBODIMENT

Embodiments of the present disclosure are now described hereinafter with reference to the drawings.

Figure 1:
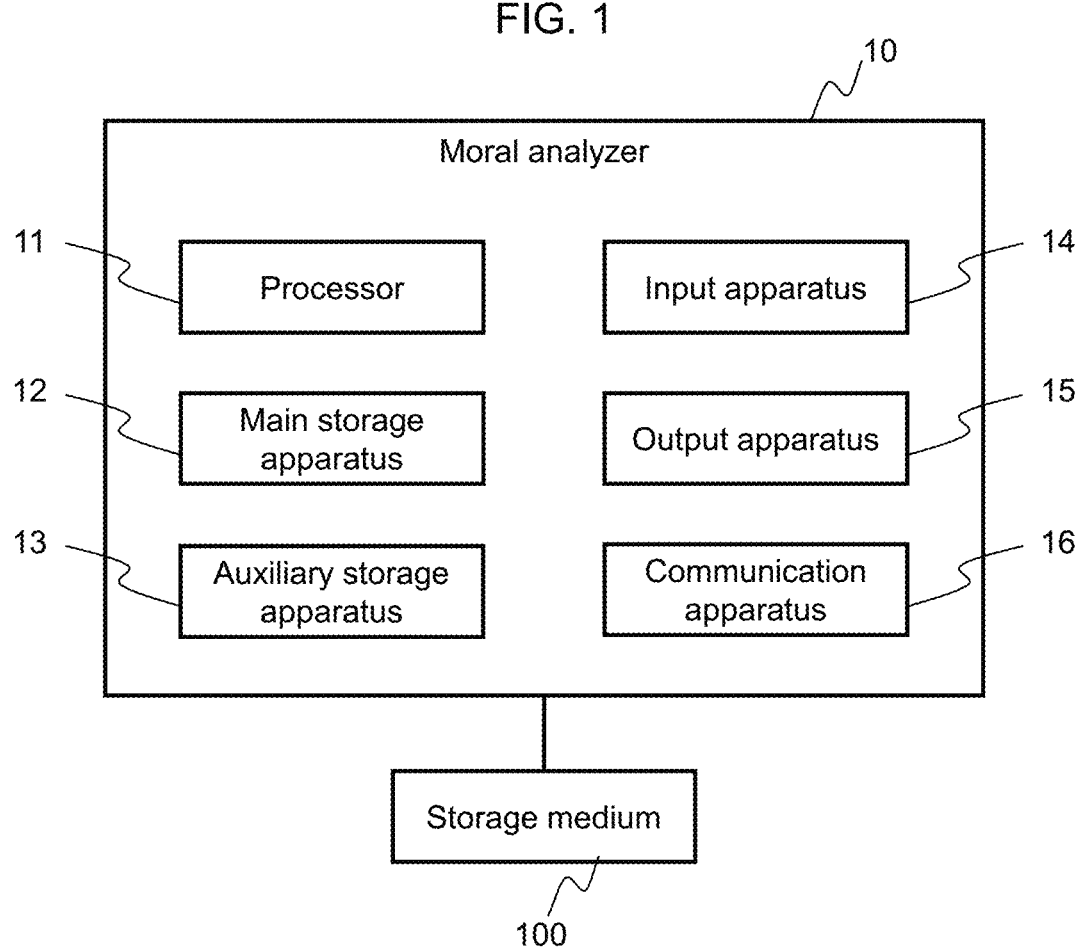
FIG. 1 is a configuration diagram illustrating a hardware configuration of a moral analyzer according to an embodiment of the present disclosure.

FIG. 1 is a configuration diagram illustrating a hardware configuration of a moral analyzer according to an embodiment of the present disclosure. A moral analyzer 10 illustrated in FIG. 1 is, for example, an information processing apparatus. The moral analyzer 10 may be realized by using a cloud server or the like provided by a cloud system, or may be realized by using a terminal device such as a PC (personal computer).

The moral analyzer 10 illustrated in FIG. 1 includes a processor 11, a main storage apparatus 12, an auxiliary storage apparatus 13, an input apparatus 14, an output apparatus 15, and a communication apparatus 16. These components are communicably connected to one another via a communication means such as a bus, not shown.

The processor 11 is configured using, for example, a CPU (Central Processing Unit) and an MPU (Micro Processing Unit). The processor 11 realizes various functions of the moral analyzer 10 by reading and executing a program (computer program) stored in the main storage apparatus 12. The main storage apparatus 12 is an apparatus for storing programs and data, and is, for example, a ROM (Read Only Memory), a RAM (Random Access Memory), a non-volatile semiconductor memory (NVRAM (Non Volatile RAM)), or the like.

The auxiliary storage apparatus 13 is composed of, for example, a hard disk drive, an SSD (Solid State Drive), an optical storage apparatus (e.g., a CD (Compact Disc), a DVD (Digital Versatile Disc), etc.), an IC card, an SD memory card, or the like. In addition, a storage system, a cloud server, or the like may be used as the auxiliary storage apparatus 13. The auxiliary storage apparatus 13 stores programs and data. The programs and data stored in the auxiliary storage apparatus 13 are loaded into the main storage apparatus 12 as needed.

The input apparatus 14 is configured using, for example, a keyboard, a mouse, a touch panel, a card reader, a voice input apparatus, and the like. The input apparatus 14 receives various information from a user who uses the moral analyzer 10. The output apparatus 15 provides the user with various information such as a processing progress and a processing result. The output apparatus 15 is configured using, for example, a screen display apparatus (liquid crystal monitor, LCD (Liquid Crystal Display), graphic card, etc.), an audio output apparatus (speaker, etc.), a printing apparatus, and the like.

The communication apparatus 16 is a wired or wireless communication interface that realizes communication with other apparatuses via a communication means such as LAN or the Internet, and is configured using, for example, a NIC (Network Interface Card), a wireless communication module, a USB (Universal Serial Interface) module, a serial communication module, and the like.

Note that information may be input and output between other apparatuses, not shown, via the communication apparatus 16. The moral analyzer 10 may also include hardware such as an ASIC (Application Specific Integrated Circuit) in addition to the configuration described above. Furthermore, a part or all of the computer programs and data included in the present disclosure can be stored in a non-volatile storage medium 100.

Figure 2:
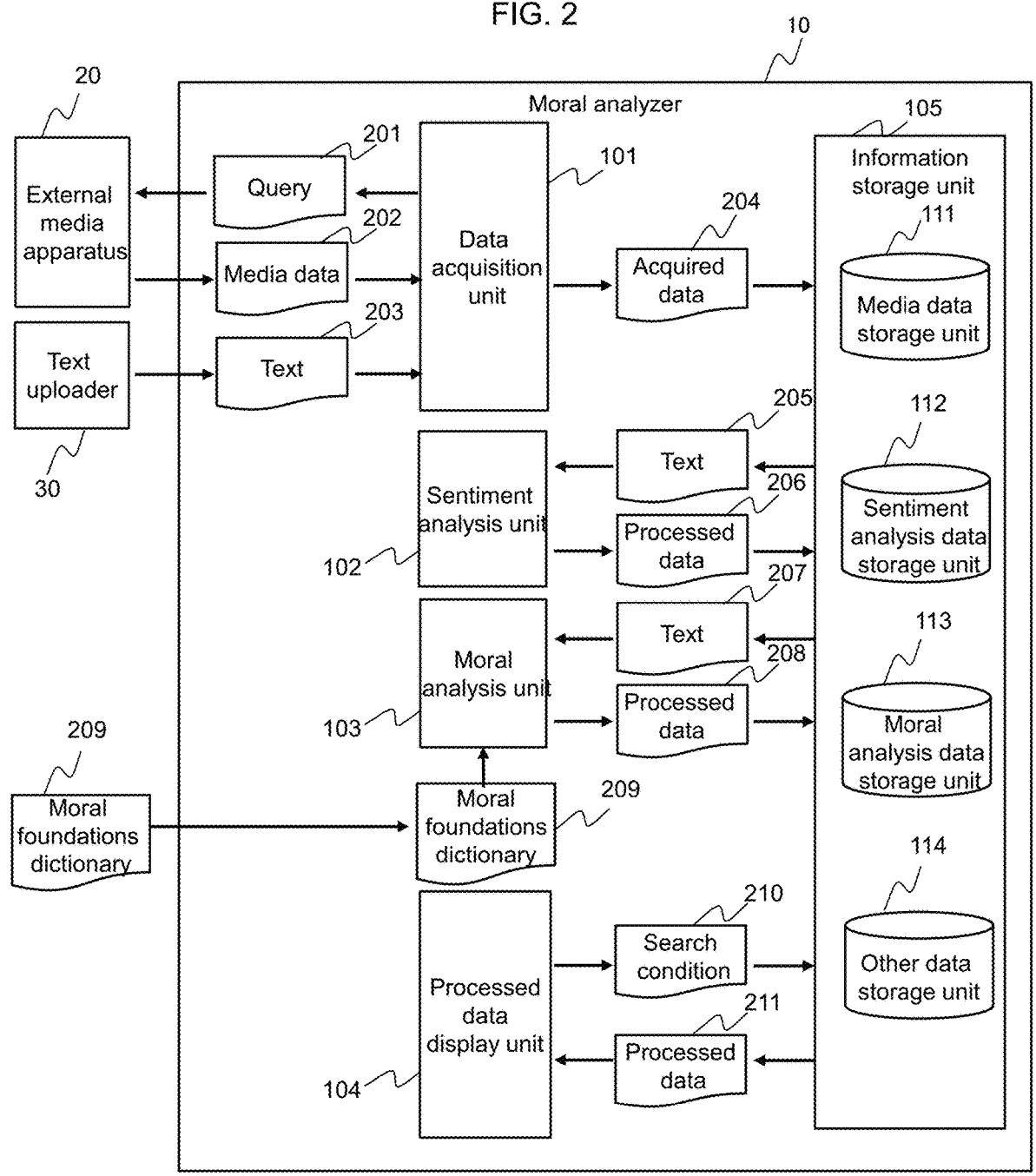
FIG. 2 is a diagram illustrating an example of a functional configuration of the moral analyzer according to an embodiment of the present disclosure.

FIG. 2 is a diagram illustrating an example of a functional configuration of the moral analyzer 10. As illustrated in FIG. 2, the moral analyzer 10 includes a data acquisition unit 101, a sentiment analysis unit 102, a moral analysis unit 103, a processed data display unit 104, and an information storage unit 105. Furthermore, the information storage unit 105 includes a media data storage unit 111, a sentiment analysis data storage unit 112, a moral analysis data storage unit 113, and another data storage unit 114. Each of these units of the moral analyzer 10 illustrated in FIG. 2 is realized by using the hardware configuration illustrated in FIG. 1. For example, at least one of the units may be realized by the processor 11 reading and executing a program stored in the main storage apparatus 12 or the auxiliary storage apparatus 13. Furthermore, at least one of the units may be realized by using hardware such as an ASIC.

Also, the moral analyzer 10 is connected to an external media apparatus 20 so as to be mutually communicable. The moral analyzer 10 may also include a text uploader 30. The external media apparatus 20 is a storage apparatus for storing a set of text data, and is usually provided separately from the moral analyzer 10. In the present embodiment, the external media apparatus 20 stores, as text data, media data posted on social media such as a microblog. The text uploader 30 is a terminal device or the like, and is an apparatus for uploading text data to the moral analyzer 10.

The data acquisition unit 101 is an acquisition unit for acquiring text data. Specifically, the data acquisition unit 101 transmits a query 201, which is a search query defining extraction conditions for extracting media data from the external media apparatus 20, to the external media apparatus 20, and acquires media data 202 matching the extraction conditions of the query 201. The data acquisition unit 101 may also acquire a text 203, which is text data uploaded from the text uploader 30. In the present embodiment, the text 203 is a CSV (Comma Separated Values) file, but is not limited to the CSV file. The data acquisition unit 101 stores the acquired media data 202 and text 203 as acquired data 204, in the media data storage unit 111 of the information storage unit 105.

The sentiment analysis unit 102 acquires, as a text 205, the text data stored as the acquired data 204 in the media data storage unit 111. The sentiment analysis unit 102 executes sentiment analysis processing for evaluating a sentiment expressed in the text 205 (a sentiment of the creator of the text 205), and stores, in the sentiment analysis data storage unit 112 of the information storage unit 105, processed data 206 associating the text 205 with sentiment-imparting information which is the processing result of the sentiment analysis processing. The creator is, for example, a poster who posts text data on social media. In the present embodiment, the sentiment-imparting information includes a sentiment score in which that a sentiment of the creator is quantified.

The moral analysis unit 103 acquires the processed data 206 stored in the sentiment analysis data storage unit 112, as a text 207. The moral analysis unit 103 executes moral analysis processing for analyzing the text 207 from a moral point of view, and stores processed data 208 in which the processing result of the moral analysis processing is associated with the text 207, in the moral analysis data storage unit 113 of the information storage unit 105.

The moral analysis processing is executed based on a moral foundations dictionary (MFD) 209, which is dictionary data defining morality-related words related to morality. The moral foundations dictionary 209 may be configured in the moral analyzer 10 from the outside.

The moral foundations dictionary 209 is dictionary data created based on the moral foundations theory advocated by social psychologist Jonathan Haidt. According to the moral foundations theory, morality is classified into six moral foundations, which are the basic categories (care, fairness, ingroup, authority, purity, and morality general), and in the moral foundations dictionary 209, the morality-related words belong to at least one of the six moral foundations. In addition, of the six moral foundations, in the five moral foundations (care, fairness, ingroup, authority, and purity) excluding the morality general, the morality-related words are divided into "virtue" conforming to the relevant moral foundation, and "(vice)" not conforming to the moral foundation, depending on whether the morality-related words conform to the moral foundations. Therefore, morality consists of 11 subdivided moral foundations: care virtue, fairness virtue, ingroup virtue, authority virtue, purity virtue, care vice, fairness vice, ingroup vice, authority vice, purity vice, and morality general. Hereinafter, the six moral foundations are often referred to as basic moral foundations, and 11 subdivided moral foundations are often simply referred to as moral foundations. Note that the language of morality-related words specified in the moral foundations dictionary are not limited. For example, the moral foundations dictionary may be written in English or Japanese.

The processed data display unit 104 is an analysis unit that acquires processed data 211, which is the processed data 208 conforming to a search condition 210, from the moral analyzer 10, quantitatively analyzes the moral value of the processed data 211, and visualizes the moral value by displaying the analysis result of the moral value.

The information storage unit 105 stores various information. Specifically, the media data storage unit 111 stores the acquired data 204. The sentiment analysis data storage unit 112 stores the processed data 206. The moral analysis data storage unit 113 stores the processed data 208. The other data storage unit 114 stores other data. Examples of the other data include user data about the user who uses the moral analyzer 10.

Figure 3:
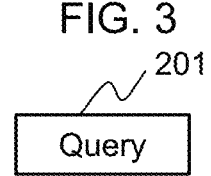
FIG. 3 is a diagram illustrating an example of a query.

FIG. 3 is a diagram illustrating an example of the query 201. The query 201 illustrated in FIG. 3 is an inquiry statement transmitted by the data acquisition unit 101 to the external media apparatus 20 in order to acquire the media data 202. The query 201 indicates, for example, a search keyword as an extraction condition. In this case, the external media apparatus 20 returns the media data including the search keyword to the data acquisition unit 101 as the media data 202. Note that the media data 202 is provided with metadata indicating the date and time when the media data 202 was created, the creator of the media data 202, the storage source of the media data 202, and the like.

Figure 4:
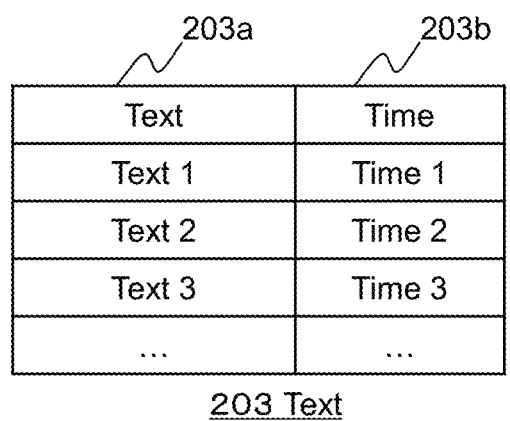
FIG. 4 is a diagram illustrating an example of text data.

FIG. 4 is a diagram illustrating an example of the text 203. The text 203 illustrated in FIG. 4 is a CSV file and includes fields 203a and 203b. The field 203a stores text data. The field 203b stores time information related to the text data of the field 203a. The time information indicates, for example, the date and time when the text data was created or the date and time when the text data was updated.

Figure 5:
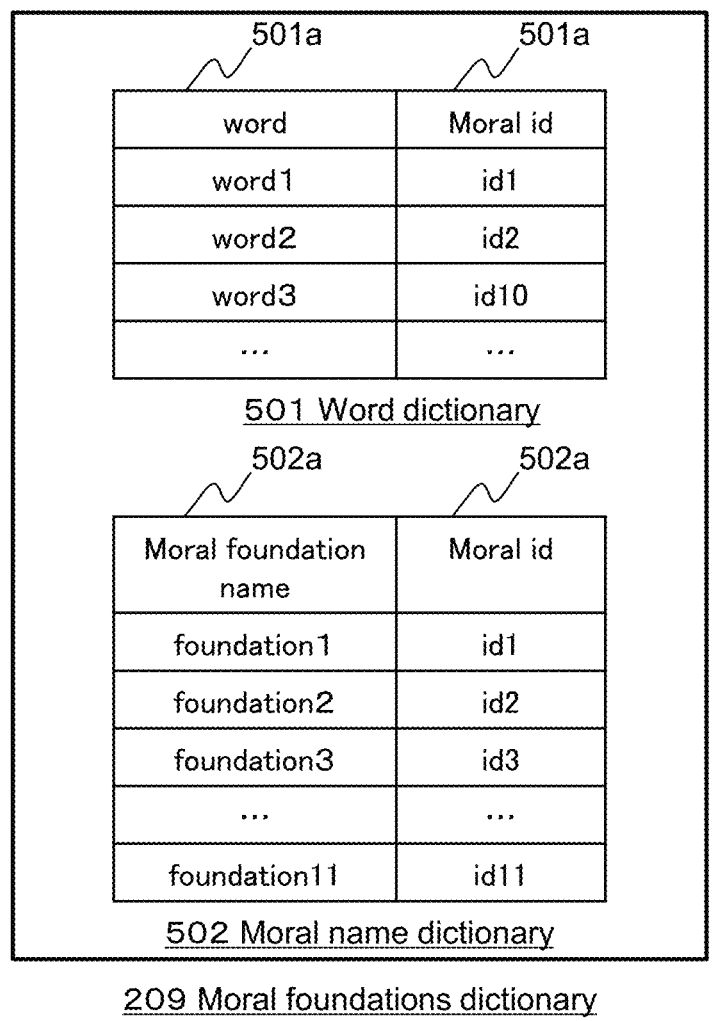
FIG. 5 is a diagram illustrating an example of a moral foundations dictionary.

FIG. 5 is a diagram illustrating an example of the moral foundations dictionary 209. Note that, in the example of FIG. 5, the moral foundations dictionary 209 is formed into a CSV file so as to be handled easily by the moral analyzer 10. However, the format of the moral foundations dictionary 209 is not limited to a CSV file.

The moral foundations dictionary 209 illustrated in FIG. 5 includes a word dictionary 501 and a moral name dictionary 502. The word dictionary 501 includes fields 501a and 501b. The field 501a stores morality-related words (words), which are words related to morality. The field 501b stores moral IDs (Moral id), which are identification information for identifying the moral foundations to which the morality-related words belong.

The moral name dictionary 502 includes fields 502a and 502b. The field 502a stores moral foundation names, which are the names of the moral foundations to which the morality-related words belong. The field 502b stores moral IDs for identifying the moral foundations.

In the moral foundations dictionary 209, the names and identification information of the basic moral foundations may be stored instead of or in addition to the moral foundation names and the moral IDs.

Figure 6:
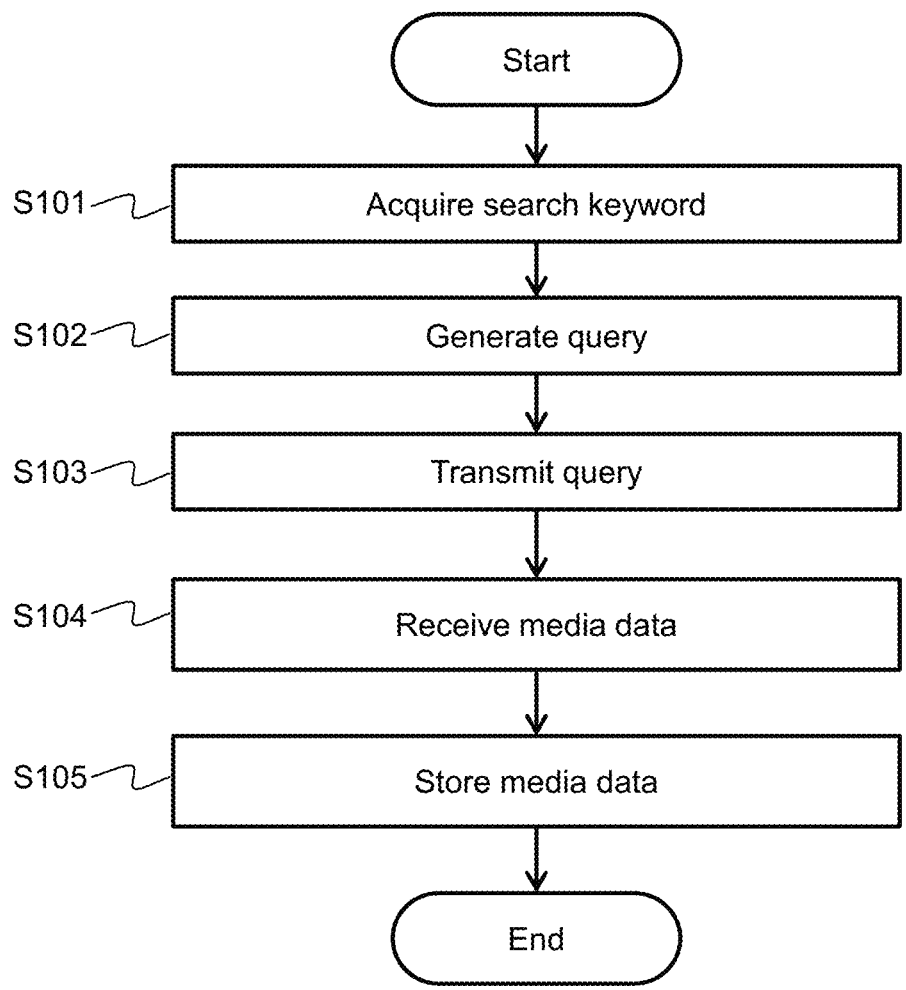
FIG. 6 is a flowchart for explaining an example of an operation of a data acquisition unit.

FIG. 6 is a flowchart for explaining an example of an operation of the data acquisition unit 101. The following operation is executed periodically or when instructed by the user.

First, the data acquisition unit 101 acquires a search keyword (step S101). For example, the data acquisition unit 101 may acquire, as a search keyword, a word input by the user into the input apparatus 14, or may acquire, via the communication apparatus 16, a word transmitted by the user using a user terminal device (not shown).

The data acquisition unit 101 generates the query 201, which is a search query, based on the acquired search keyword (step S102). The data acquisition unit 101 transmits the generated query 201 to the external media apparatus 20 (step S103).

The external media apparatus 20 transmits the media data 202, which is text data (for example, text data including the search keyword) corresponding to the query 201. The data acquisition unit 101 receives the media data 202 (step S104). The data acquisition unit 101 stores the received media data 202 as the acquired data 204 in the media data storage unit 111 (step S105), and ends the processing.

Figure 7:
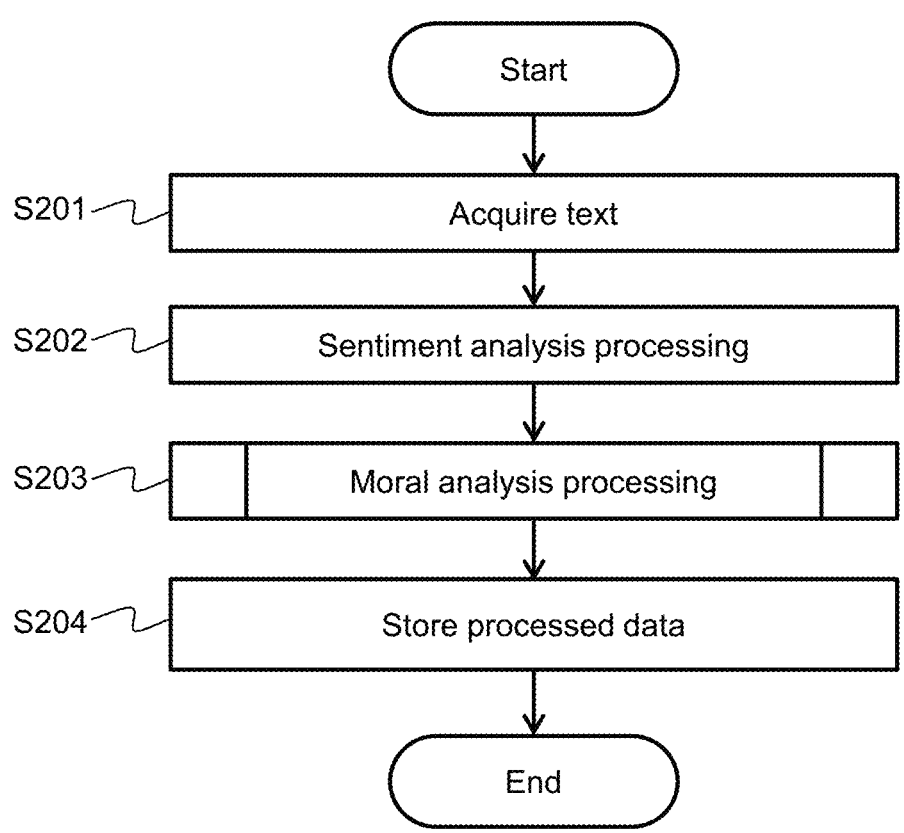
FIG. 7 is a flowchart for explaining examples of operations of a sentiment analysis unit and a moral analysis unit.

FIG. 7 is a flowchart for explaining examples of operations of the sentiment analysis unit 102 and the moral analysis unit 103. The following operations are executed periodically, for example.

First, the sentiment analysis unit 102 acquires the text 205, which is the acquired data 204 to be analyzed in the sentiment analysis processing, from the media data storage unit 111 (step S201). The text 205 is, for example, text data of the acquired data 204 that has not been subjected to the sentiment analysis processing and the moral analysis processing, the acquired data 204 being stored in the media data storage unit 111.

The sentiment analysis unit 102 performs the sentiment analysis processing on the acquired text 205, imparts sentiment-imparting information, which is the processing result of the sentiment analysis processing, to the text 205, and stores the resultant text 205 as the processed data 206 in the sentiment analysis data storage unit 112 (Step S202).

The sentiment analysis processing includes, for each text 205, processing for calculating a sentiment score that is obtained by quantifying the sentiment expressed in the text 205, on the basis of each word included in the text 205. Here, the sentiment score is a numerical value from −1 to 1, wherein the closer the value is to −1, the more "negative sentiment" is shown, and the closer the value is to 1, the more "positive sentiment" is shown. The sentiment score can be calculated as, for example, a value obtained by subtracting the degree of negativeness, which is a numerical value from 0 to 1 indicating the degree of a negative sentiment, from the degree of positiveness, which is a numerical value from 0 to 1 indicating the degree of a positive sentiment. Also, the sentiment analysis processing can be executed using, for example, a machine learning model. The processed data 206 is data in which the sentiment-imparting information containing the sentiment score is associated with the text 205.

The moral analysis unit 103 acquires the processed data 206 to be analyzed in the moral analysis processing, as a text 207, from the sentiment analysis data storage unit 112, and performs the moral analysis processing (see FIG. 8) on the text 207 (step S203). The moral analysis unit 103 imparts the morality-imparting information, which is the processing result of the moral analysis processing, to the text 207, and stores the resultant text 207 as the processed data 208 in the moral analysis data storage unit 113 (step S202).

Figure 8:
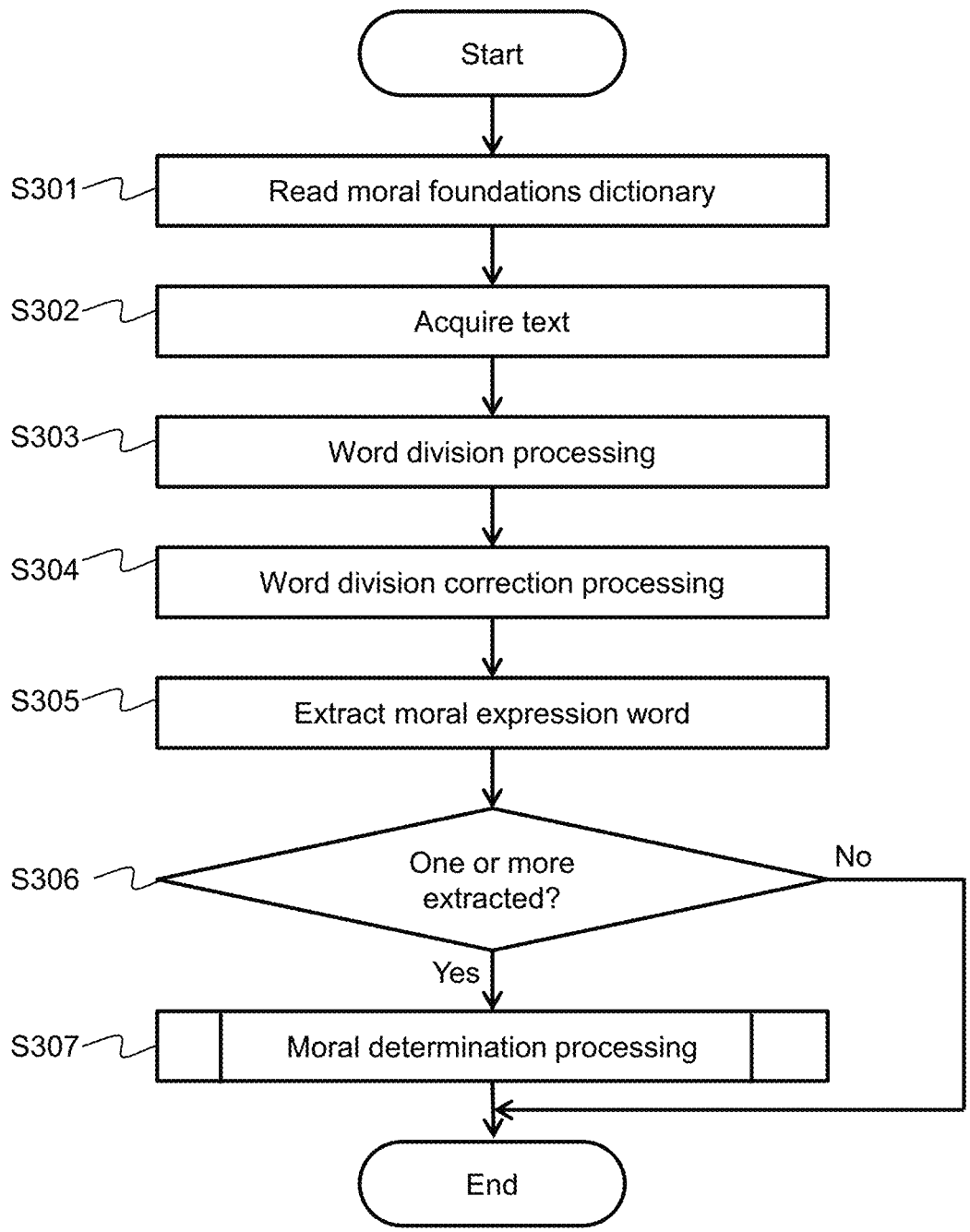
FIG. 8 is a flowchart for explaining an example of moral analysis processing.

FIG. 8 is a flowchart for explaining an example of the moral analysis processing of step S203 illustrated in FIG. 7.

In the moral analysis processing, first, the moral analysis unit 103 reads the moral foundations dictionary 209 (step S301). The moral analysis unit 103 acquires the processed data 206 to be analyzed in the moral analysis processing as the text 207 from the sentiment analysis data storage unit 112 (step S302).

The moral analysis unit 103 executes word division processing for breaking apart the text 207 into words (step S303). The word division processing can be performed using, for example, a machine learning model. The word division processing may also be performed without using a machine learning model such as morpheme decomposition.

The moral analysis unit 103 executes word division correction processing for correcting the processing result of the word division processing (step S304). The word division correction processing is the processing for correcting each word decomposed by the word division processing into the format of a morality-related word included in the moral foundations dictionary 209. For example, when the morality-related word "parenthood" is registered in the moral foundations dictionary 209, the moral analysis unit 103 executes the word division processing thereon and, if the word "parent" is present in the processing result of the word division processing, checks the text 207 to see whether the word "hood" follows the word "parent." Then, if the "hood" is present next to the "parent" in the text 207, the moral analysis unit 103 corrects the word "parent" of the processing result of the word division processing, to "parenthood."

Also, the word division correction processing may be the processing for deleting stop words, which are words that appear frequently but has no special meaning such as "a", "the", "of", "you" and "there", and punctuation from each word decomposed by the word division processing. In this case, these words are excluded from matching with morally-related words.

The moral analysis unit 103 collates each morality-related word in the word dictionary 501 of the moral foundations dictionary 209 with each word in the text 207 corrected by the word division correction processing, and extracts, from the text 207, the word matching the morality-related word as a moral expression word. The moral analysis unit 103 further extracts the moral ID corresponding to the moral expression word from the word dictionary 501, and extracts the moral foundation name corresponding to the moral ID extracted from the moral name dictionary 502 of the moral foundations dictionary 209 (step S305).

The moral analysis unit 103 then determines whether or not one or more moral expression words have been extracted (step S306).

If one or more moral expression words are not extracted, the moral analysis unit 103 ends the processing. On the other hand, if one or more moral expression words are extracted, the moral analysis unit 103 executes moral determination processing (FIG. 9) for classifying each of the moral expression words into either a virtue word conforming to morality or a vice word violating morality (step S307), and ends the processing.

Figure 9:
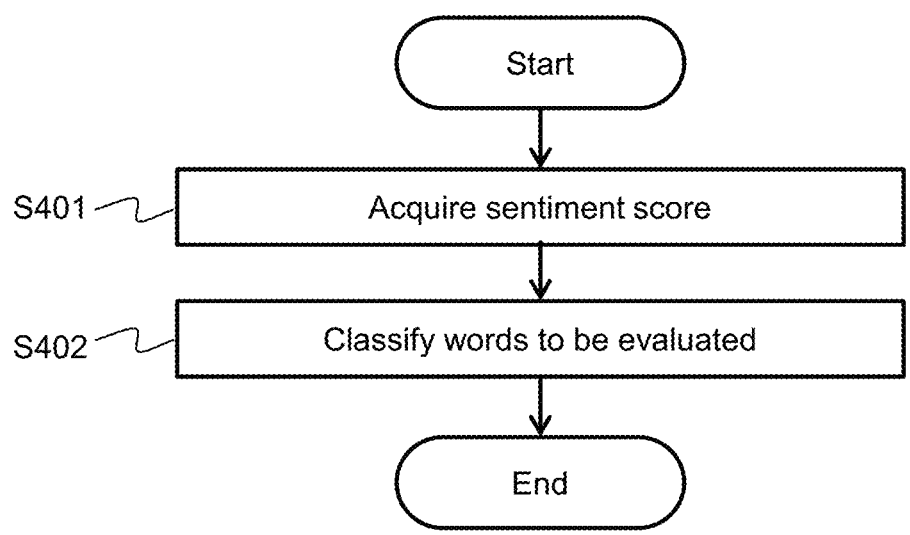
FIG. 9 is a flowchart for explaining an example of moral determination processing.

FIG. 9 is a flowchart for explaining an example of the moral determination processing of step S307 illustrated in FIG. 8.

In the moral determination processing, first, the moral analysis unit 103 acquires sentiment scores from the text 207 (step S401).

Based on classification conditions related to the sentiment scores, the moral analysis unit 103 executes classification processing for classifying the moral expression word extracted from the text 207 into either a virtue word conforming to morality or a vice word violating morality. The moral analysis unit 103 generates classification information, which is the processing result of the classification processing, as the morality-imparting information (step S402), and ends the processing.

In the present embodiment, the moral analysis unit 103 compares the sentiment score with a predetermined threshold value with respect to each text 207, and classifies each moral expression word extracted from the text 207 into either a virtue word or a vice word. The threshold value is adjustable. For example, when the sentiment score of the text 207 is −0.05 or lower, the moral analysis unit 103 determines that the sentiment expressed in the text 207 is negative, and classifies each moral expression word extracted from the text 207 into a vice word. When the sentiment score is 0.05 or higher, the moral analysis unit 103 determines that the sentiment expressed in the text 207 is positive, and classifies each moral expression word extracted from the text 207 into a virtue word. Furthermore, when the sentiment score is higher than −0.05 and lower than 0.05, the moral analysis unit 103 determines that the sentiment expressed in the text 207 is neutral, and classifies each moral expression word extracted from the text 207 into either a virtue word or a vice word in accordance with its compliance to the moral foundation of the moral expression word. In other words, when the sentiment is neutral, the moral analysis unit 103 classifies the moral expression word as a virtue word if the moral foundation to which the moral expression word belongs is an care virtue, a fairness virtue, an ingroup virtue, an authority virtue, or a purity virtue. However, if the moral foundation to which the moral expression word belongs is an care vice, a fairness vice, an ingroup vice, an authority vice or a purity vice, the moral analysis unit 103 classifies the moral expression word into a vice word.

Note that the moral analysis unit 103 may classify the moral expression word into either a virtue word or a vice word based on a predetermined classification condition without using the sensitivity scores.

In addition, in the present embodiment, the moral analysis unit 103 does not classify a moral expression word whose moral foundation is general morality into a virtue word or a vice word. However, in the present embodiment, the moral analysis unit 103 may perform the moral expression word classification on a moral expression word whose moral foundation indicates general morality.

Figure 10:
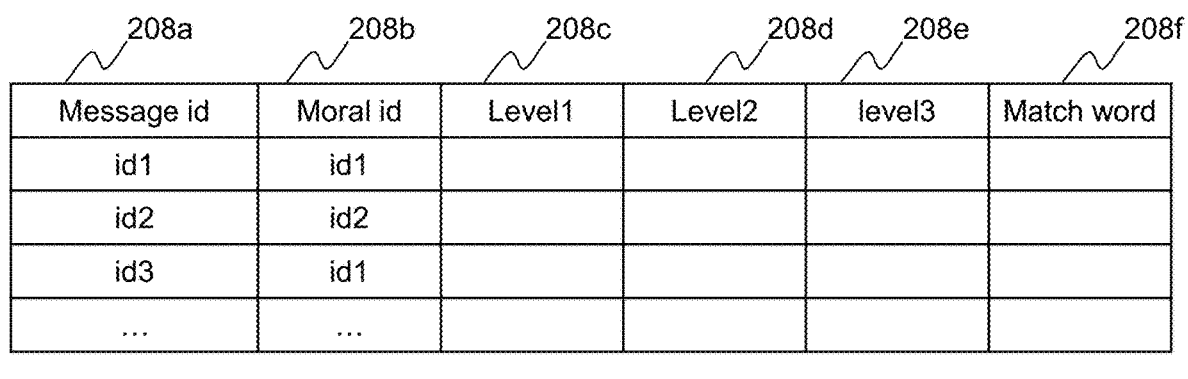
FIG. 10 is a diagram illustrating an example of processed data.

FIG. 10 is a diagram illustrating an example of the processed data 208 which is the processing result from the moral analysis unit 103. The processed data 208 illustrated in FIG. 10 has fields 208a to 208f.

The field 208a stores a message ID (Message id) which is identification information for identifying the text data. The field 208b stores a moral ID that identifies the moral foundation to which the moral expression word contained in the text data belongs. The fields 208c to 208e store the classification information which is the processing result of the moral analysis processing on the moral expression word. Specifically, the field 208c stores Level 1, which is an indicator indicating the basic moral foundation of the moral expression word. The field 208d stores Level 2, which is an indicator indicating the compliance to the morality of the moral expression word. The compliance indicates "virtue word" or "vice word". The field 208e stores Level 3 which is an indicator of the basic moral foundation and compliance. The field 208*f* stores moral expression words. The processed data 208 may include a field for storing other data.

Figure 11:
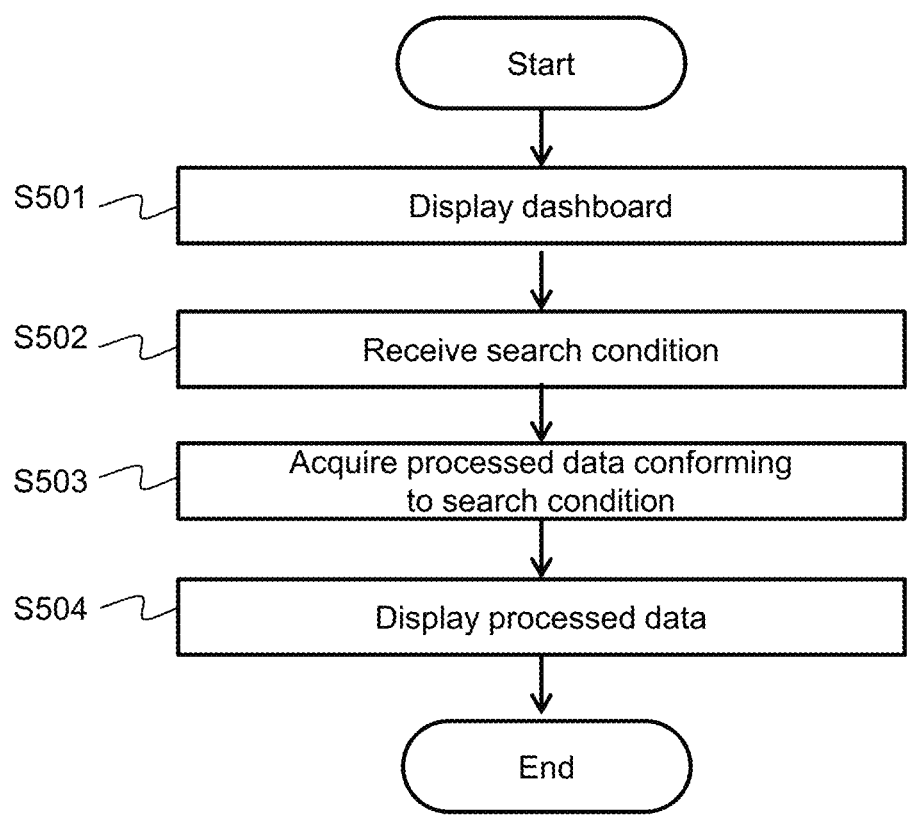
FIG. 11 is a flowchart for explaining an example of an operation of a processed data display unit.

FIG. 11 is a flowchart for explaining an example of the operation of the processed data display unit 104.

The processed data display unit 104 displays a dashboard for displaying an analysis result obtained by quantitatively analyzing the moral values of the processed data 211 (step S501). Subsequently, the processed data display unit 104 acquires the search condition 210 that is input from the user via the dashboard (step S502).

The processed data display unit 104 searches for the processed data 208 stored in the moral analysis data storage unit 113 based on the search condition 210, and acquires the processed data 211 which is the processed data 208 conforming to the search condition 210 (Step S503). Then, based on the moral expression word and morality-imparting information (classification information) of the processed data 211, the processed data display unit 104 executes analysis processing for quantitatively analyzing the moral value of the text data corresponding to the processed data 211 (text data identified by the message ID stored in the field 208*a* illustrated in FIG. 10), to generate an analysis result of the analysis processing, adds the analysis result to the dashboard (step S504), and ends the processing.

In the present embodiment, in the analysis processing, the processed data display unit 104 analyzes the moral values based on the number of virtue words and the number of vice words contained in the processed data 211. For example, the processed data display unit 104 evaluates the ratio of virtue words corresponding to the moral expression words contained in the processed data 211 and the ratio of vice words corresponding to the moral expression words contained in the processed data 208, as moral values. The processed data display unit 104 may also analyze the moral values based on the number of moral expression words, or the number of virtue words and the number of vice words with respect to each basic moral foundation. For example, the processed data display unit 104 may analyze the moral values based on the number of moral expression words with respect to each basic moral foundation, or analyze the moral values based on the number of virtue words and the number of vice words with respect to each basic moral foundation.

Figure 12:
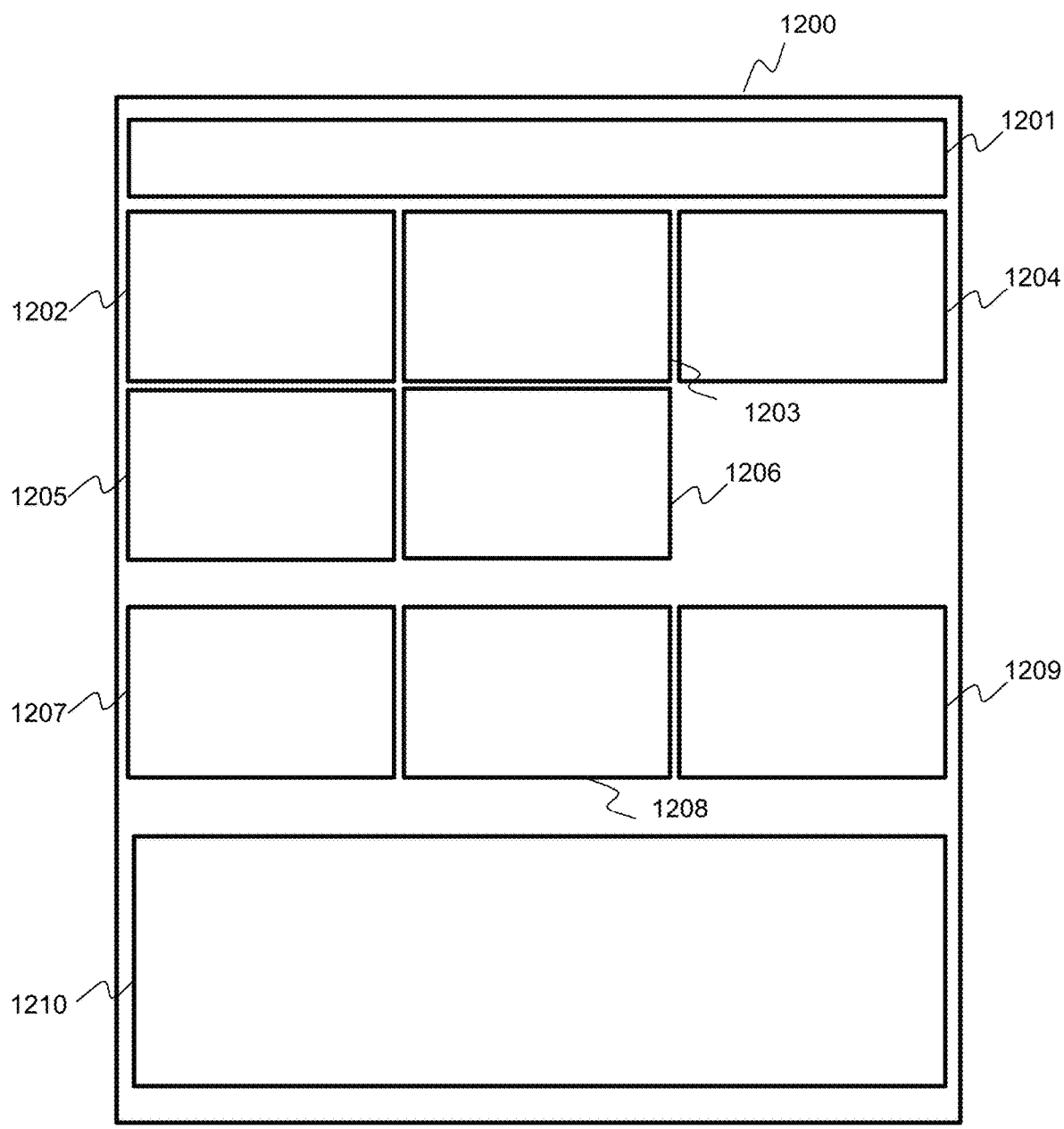
FIG. 12 is a diagram illustrating an example of a dashboard.

FIG. 12 is a diagram illustrating an example of a dashboard. A dashboard 1200 illustrated in FIG. 12 includes a search area 1201, a pie chart area 1202, a moral foundation ratio area 1203, a moral foundation count area 1204, a moral foundation ranking area 1205, a timeline area 1206, word cloud areas 1207 to 1209, and a message list area 1210. In the example of FIG. 12, there are a plurality of the word cloud areas 1207.

The search area 1201 is an area for inputting the search condition 210. The areas from the pie chart area 1202 to the word cloud areas 1207 are for displaying the analysis results. The message list area 1210 is an area for displaying text data corresponding to the processed data 211.

Figure 13:
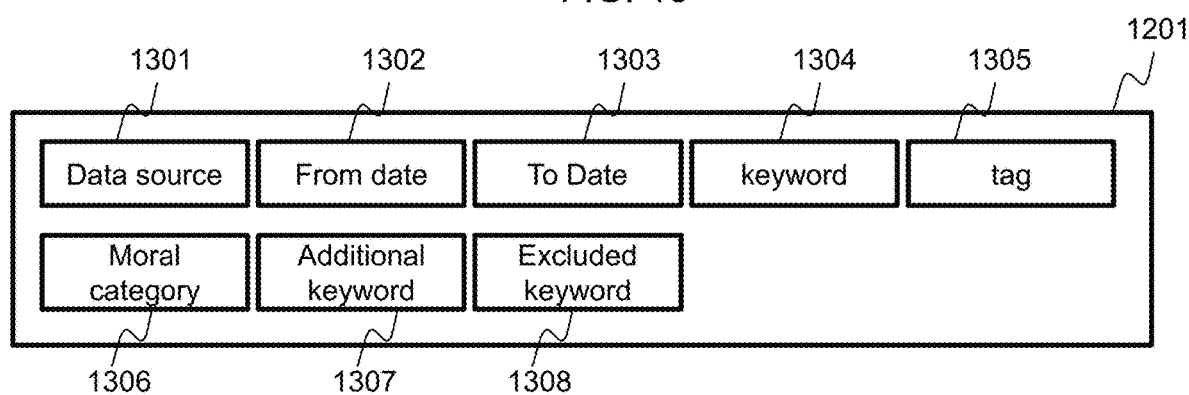
FIG. 13 is a diagram illustrating an example of a search area.

FIG. 13 is a diagram illustrating an example of the search area 1201. The search area 1201 illustrated in FIG. 13 includes input areas 1301 to 1308 for inputting search conditions.

Specifically, the input area 1301 is an area for selecting a data source of the processed data 211 to be searched. The data source indicates a storage source of text data that is the source of the processed data 211, and indicates, for example, the types of social media, files (text data) uploaded by the text uploader 30, and the like. The input area 1302 is an area for inputting the start date and time (From date) of a creation time range in which search target data to be searched is created. The input area 1303 is an area for inputting the end date and time (To date) of the creation time range. The input area 1304 is an area for inputting a keyword included in the processed data 211 to be searched. The input area 1305 is an area for inputting a tag included in the processed data 211 to be searched. The tag is appropriately configured by, for example, the sentiment analysis unit 102.

The input area 1306 is an area for inputting the basic moral foundation or moral foundation of a moral expression word included in the processed data 211 to be searched. The input area 1307 is an area for inputting an additional keyword included in the processed data 211 to be searched. The input area 1308 is an area for inputting an excluded word (Excluded keyword) to be excluded from the processed data 211 to be searched.

Figure 14:
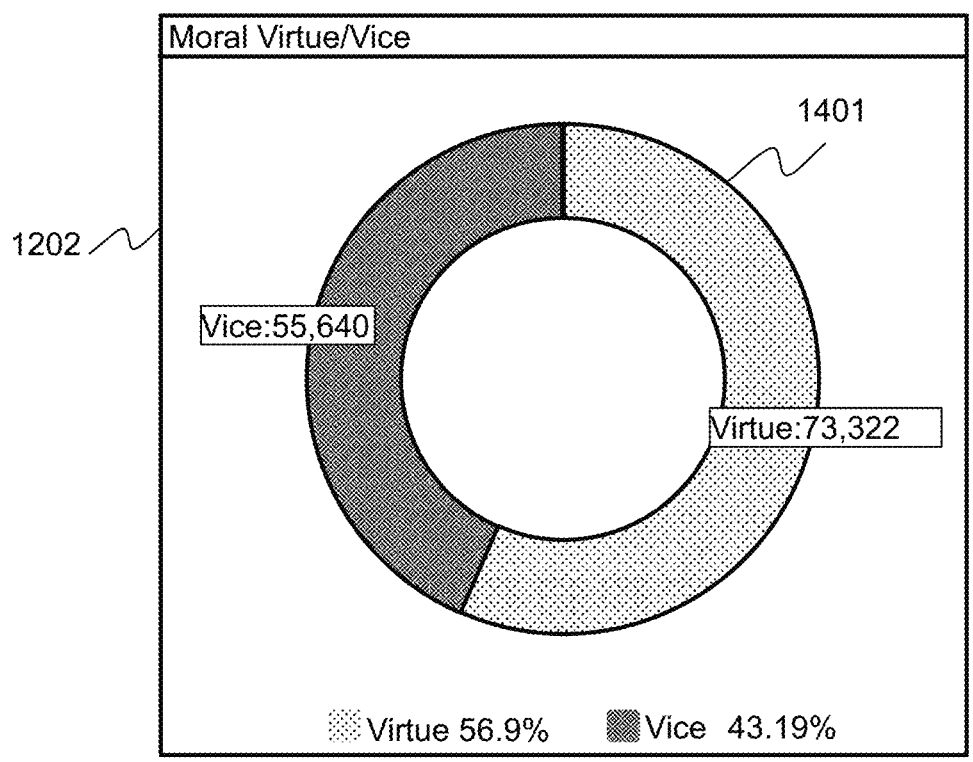
FIG. 14 is a diagram illustrating an example of a pie chart area.

FIG. 14 is a diagram illustrating an example of the pie chart area 1202. The pie chart area 1202 illustrated in FIG. 14 is an area for displaying a pie chart 1401. The pie chart 1401 shows the ratio of the virtue words to the moral expression words contained in the processed data 211 and the ratio of the vice words to the moral expression words contained in the processed data 211.

Figure 15:
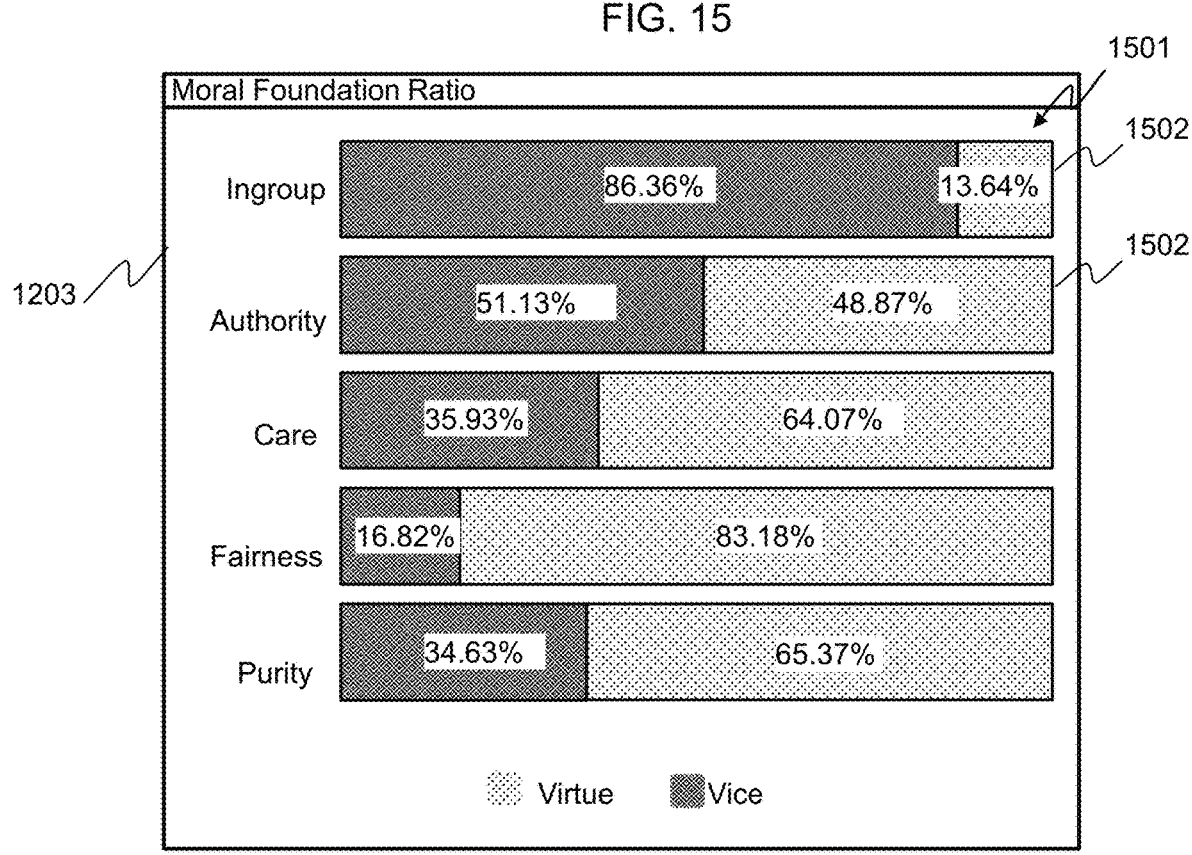
FIG. 15 is a diagram illustrating an example of a moral foundation ratio area.

FIG. 15 is a diagram illustrating an example of the moral foundation ratio area 1203. The moral foundation ratio area 1203 illustrated in FIG. 15 is an area for displaying a band chart 1501. The band chart 1501 includes five bands 1502 corresponding to five respective basic moral foundations excluding morality general. Each band 1502 indicates the ratio between virtue words and vice words in the moral expression words of the corresponding basic moral foundation that are contained in the processed data 211.

Figure 16:
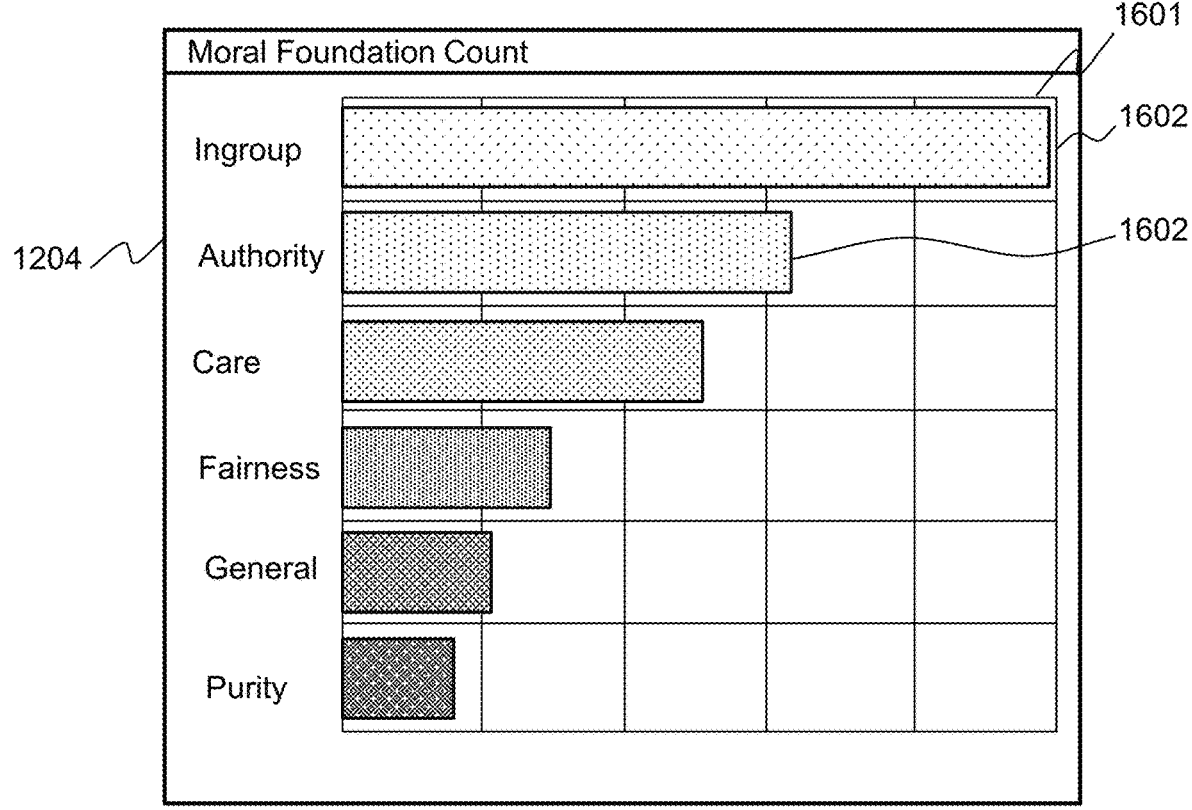
FIG. 16 is a diagram illustrating an example of a moral foundation count area.

FIG. 16 is a diagram illustrating an example of the moral foundation count area 1204. The moral foundation count area 1204 illustrated in FIG. 16 is an area for displaying a bar chart 1601. The bar chart 1601 includes six bars 1602 corresponding to the six respective basic moral foundations. Each bar 1602 indicates the number of moral expression words of the corresponding basic moral foundation that are contained in the processed data 211. Also, in the bar chart 1601, each bar 1602 is displayed in a ranking format in which the bars 1602 are arranged in descending order of the number of moral expression words.

Figure 17:
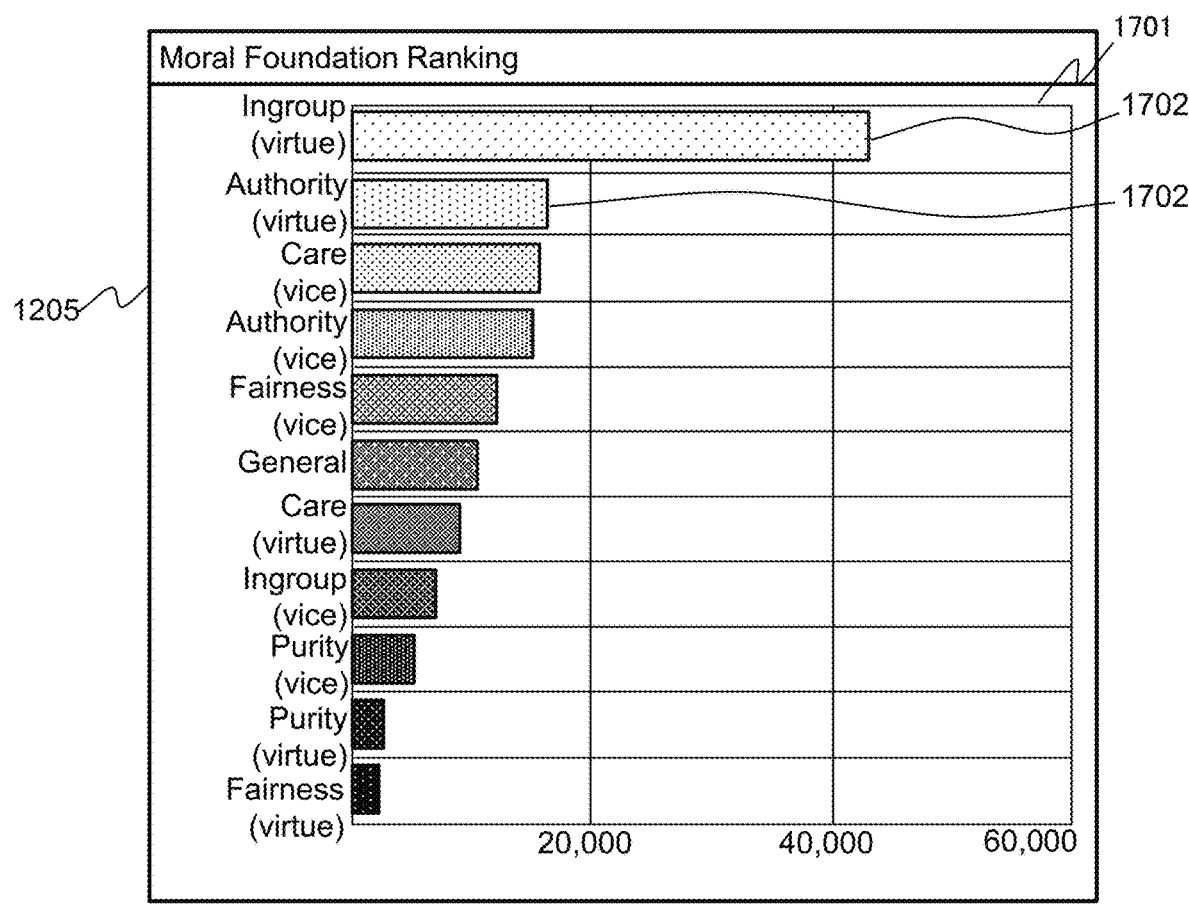
FIG. 17 is a diagram illustrating an example of a moral foundation ranking area.

FIG. 17 is a diagram illustrating an example of the moral foundation ranking area 1205. The moral foundation ranking area 1205 illustrated in FIG. 17 is an area for displaying a bar chart 1701. The bar chart 1701 includes bars 1702 showing the number of virtue words and the number of vice words in each of the six basic moral foundations. However, in a bar 1702 corresponding to morality general, the number of moral expression words is shown because virtue words and vice words are not distinguished for the morality general. Therefore, there are 11 bars 1702. Furthermore, in the bar chart 1701, the respective bars 1702 are displayed in a ranking format in which the bars 1702 are arranged in descending order of the number of words.

Figure 18:
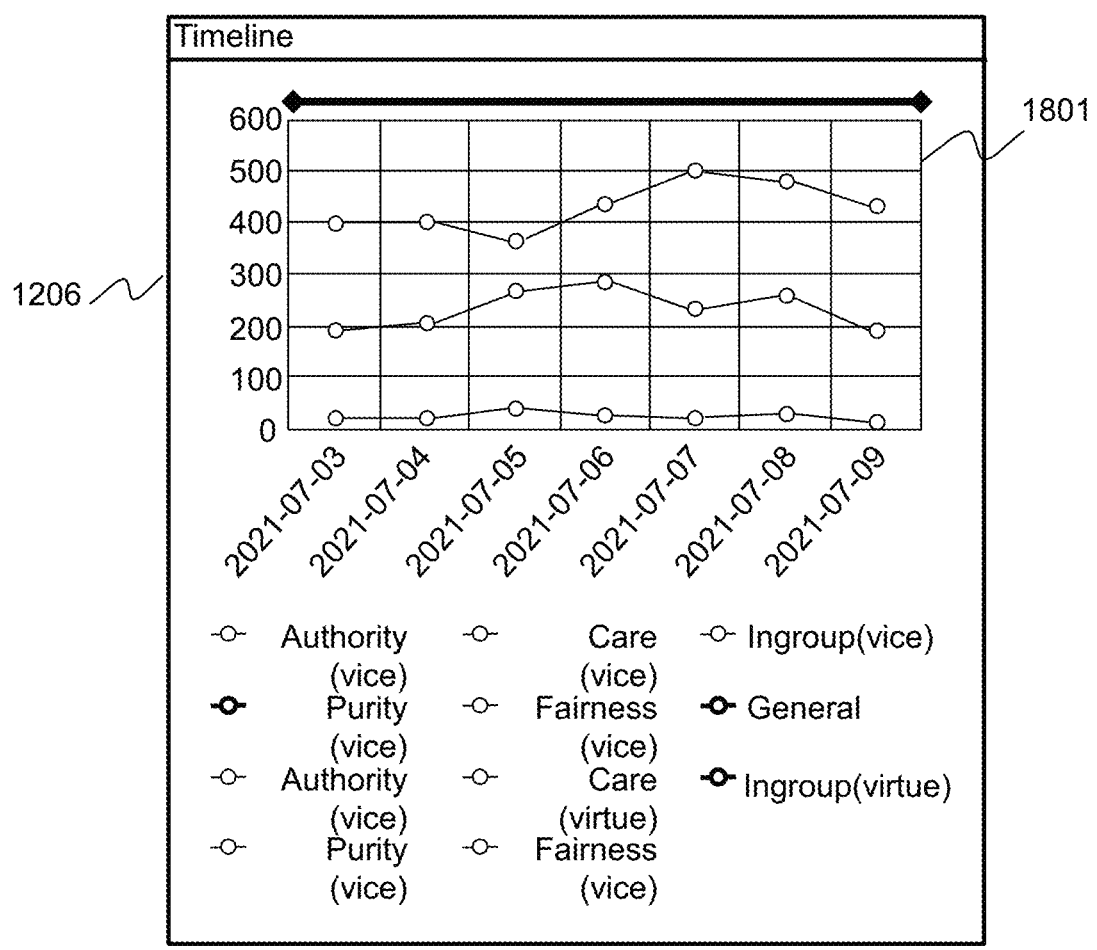
FIG. 18 is a diagram illustrating an example of a timeline area.

FIG. 18 is a diagram illustrating an example of the timeline area 1206. The timeline area 1206 illustrated in FIG. 18 is an area for displaying on a timeline 1801. The timeline 1801 shows the number of moral expression words included in the processed data 211 in chronological order with respect to each moral foundation. The moral foundations to be displayed on the timeline 1801 are selectable, and in the example of FIG. 18, "purity (vice)", "morality general" and "in-group (virtue)" are shown.

Figure 19:
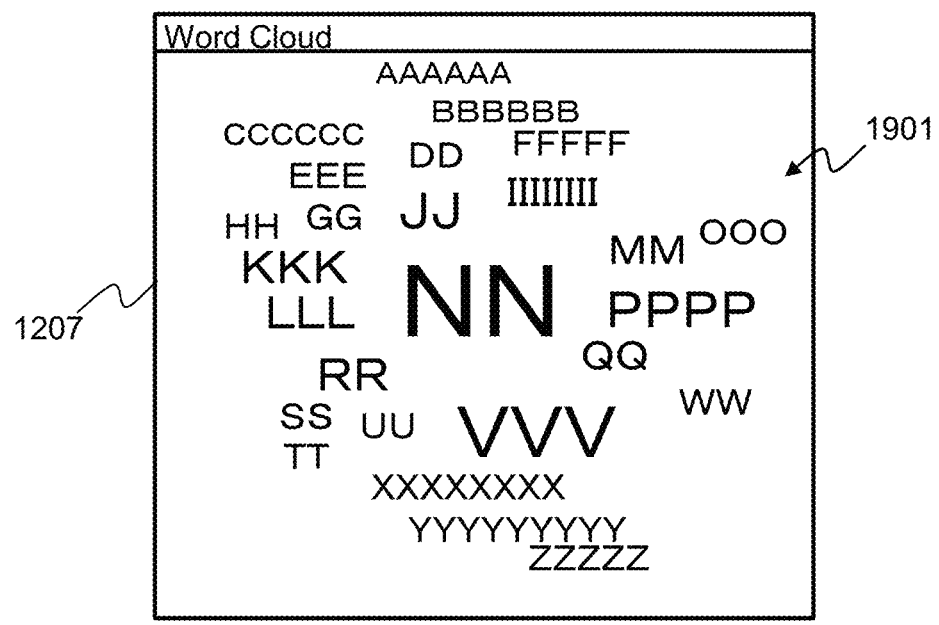
FIG. 19 is a diagram illustrating an example of a word cloud area.

FIG. 19 is a diagram illustrating an example of the word cloud area 1207 on behalf of the word cloud areas 1207 to 1209. The word cloud area 1207 is an area for displaying a word cloud 1901. The word cloud 1901 indicates a plurality of words extracted from the processed data 211 according to a predetermined extraction rule, in a size corresponding to the frequency of appearance of the words and the like. The extraction rule is not particularly limited, but examples thereof include extracting a predetermined number of words from the highest frequency of appearance. The word cloud areas 1207 to 1209 can display, for example, word clouds 1901 having different extraction rules.

Although not shown, the message list area 1210 is used, for example, to display the processed data 211.

As described above, according to the present embodiment, based on the moral foundations dictionary 209 which is the dictionary data defining the morality-related words related to morality, the moral analysis unit 103 extract words that match morality-related words, as moral expression words, from the acquired data 204 which is text data. The processed data display unit 104 analyzes the moral values of the acquired data 204 using the moral expression words. Therefore, the moral expressions contained in the acquired data 204, which is text data, can be evaluated.

Moreover, in the present embodiment, the moral analysis unit 103 generates classification information in which the moral expression words are classified into either virtue words conforming to morality or vice words violating morality, based on a predetermined classification condition. The processed data display unit 104 further uses the classification information to analyze moral values. Therefore, the moral expressions contained in the text data can be evaluated more appropriately.

In addition, in the present embodiment, the sentiment analysis unit 102 calculates the sentiment score for evaluating the sentiment of the creator of the acquired data 204. The moral analysis unit 103 generates the classification information based on the classification conditions related to the sentiment score. Therefore, since the moral expression words can be appropriately classified according to the sentiments of the creator, the moral expressions contained in the text data can be evaluated more appropriately.

Furthermore, in the present embodiment, the moral analysis unit 103 classifies sentiments into positive, neutral, or negative based on the sentiment scores. If the sentiments are positive, the moral analysis unit 103 classifies the moral expression words into virtue words. If the sentiments are negative, the moral analysis unit 103 classifies the moral expression words into vice words. Therefore, the moral expression words can be classified more appropriately.

In the present embodiment, the processed data display unit 104 analyzes the moral values based on the number of virtue words and the number of vice words. Therefore, the moral values can be analyzed more appropriately.

Further, in the present embodiment, the processed data display unit 104 analyzes the moral values with respect to each moral foundation. Therefore, the moral values can be analyzed more appropriately.

Additionally, in the present embodiment, the processed data display unit 104 analyzes the moral values based on the number of virtue words and the number of vice words with respect to each moral foundation. Therefore, the moral values can be analyzed more appropriately.

Furthermore, in the present embodiment, the processed data display unit 104 generates a ranking of the moral foundations according to the number of moral expression words. Therefore, it is possible to intuitively understand the moral values.

In the present embodiment, the moral analysis unit 103 breaks apart the acquired data 204 into words, corrects the format of each word to the format of a morality-related word, collates each corrected word with the morality-related word, and extracts a moral expression word. Therefore, the moral expression words can be extracted more appropriately.

Also, in the present embodiment, since the dictionary data is the moral foundations dictionary 209, academically supported moral expression words can be extracted, and the moral expressions contained in the text data can be evaluated more appropriately.

The embodiments of the present disclosure described above are examples for the purpose of explaining the present disclosure, and the scope of the present disclosure is not intended to be limited only to those embodiments. Those skilled in the art can implement the present disclosure in various other forms without departing from the scope of the present disclosure.

What is claimed is:

1. A moral analyzer, comprising:
a processor; and
a memory coupled to the processor, the memory storing instructions that when executed by the processor, configures to the processor to:
extract, as a moral expression word, a word matching a morality-related word related to morality from text data based on dictionary data defining the morality-related word,
generate, based on a predetermined classification condition, classification information obtained by classifying the moral expression word into either a virtue word conforming to morality or a vice word violating morality,
execute a model that calculates a sentiment score for evaluating a sentiment of a creator of the text data, the sentiment being expressed in the text data, and
analyze a moral value of the text data based on the moral expression word, the classification information, a number of the virtue words and a number of the vice words,
wherein the classification information is generated based on the classification condition related to the sentiment score.

2. The moral analyzer according to claim 1,
wherein the sentiment is classified into positive, neutral, or negative based on the sentiment score,
wherein the moral expression word is classified into the virtue word when the sentiment is positive, and the moral expression word is classified into the vice word when the sentiment is negative.

3. The moral analyzer according to claim 1,
wherein the dictionary data defines, for each of categories related to morality, the morality-related word that belongs to the category,
wherein the moral expression word is extracted for each of the categories, and
wherein the processor is configured to analyze the moral value for each of the categories.

4. The moral analyzer according to claim 3,
wherein the processor is configured to analyze the moral value for each of the categories based on the number of virtue words and the number of vice words.

5. The moral analyzer according to claim 3,
wherein the processor is configured to generate a ranking of the categories in accordance with the number of moral expression words.

6. The moral analyzer according to claim 1,
wherein the processor is configured to:
break apart the text data into words, correct a format of each of the words to a format of the morality-related word, collate each of the words having the corrected format, with the morality-related word, and extract the moral expression word.

7. The moral analyzer according to claim 1,
wherein the dictionary data indicates a moral foundations dictionary.

8. A moral analysis method by a moral analyzer, the method comprising:
extracting, as a moral expression word, a word matching a morality-related word related to morality from text data based on dictionary data defining the morality-related word;
generating, based on a predetermined classification condition, classification information obtained by classifying the moral expression word into either a virtue word conforming to morality or a vice word violating morality;
executing a model that calculates a sentiment score for evaluating a sentiment of a creator of the text data, the sentiment being expressed in the text data; and
analyzing a moral value of the text data based on the moral expression word, the classification information, a number of the virtue words and a number of the vice words,
wherein the classification information is generated based on the classification condition related to the sentiment score.

9. A non-transitory computer readable recording medium that is readable by a computer and has recorded therein a program for causing the computer to execute steps comprising:
an extraction unit that extracts, as a moral expression word, a word matching a morality-related word related to morality from text data based on dictionary data defining the morality-related word;
generating, based on a predetermined classification condition, classification information obtained by classifying the moral expression word into either a virtue word conforming to morality or a vice word violating morality;
executing a model that calculates a sentiment score for evaluating a sentiment of a creator of the text data, the sentiment being expressed in the text data; and
an analysis unit that analyzes a moral value of the text data based on the moral expression word, the classification information, a number of the virtue words and a number of the vice words,
wherein the classification information is generated based on the classification condition related to the sentiment score.

* * * * *